United States Patent [19]

Matsuzaki

[11] Patent Number: 5,096,449
[45] Date of Patent: Mar. 17, 1992

[54] METHOD FOR MANUFACTURING METAL CYLINDER MEMBERS OF ELECTRON TUBES AND METHOD FOR MANUFACTURING MAGNETRON ANODES

[75] Inventor: Toshiyuki Matsuzaki, Yokohama, Japan

[73] Assignee: Kabushiki Kaisha Toshiba, Kawasaki, Japan

[21] Appl. No.: 517,703

[22] Filed: May 2, 1990

[30] Foreign Application Priority Data

May 9, 1989 [JP] Japan .................... 1-115475
Aug. 3, 1989 [JP] Japan .................... 1-201860

[51] Int. Cl.$^5$ .................... H01J 9/14
[52] U.S. Cl. .................... 445/36; 445/49
[58] Field of Search .................... 445/36, 49

[56] References Cited

U.S. PATENT DOCUMENTS

| | | | |
|---|---|---|---|
| 3,559,278 | 2/1971 | Brandberg et al. | 228/155 X |
| 4,570,843 | 2/1986 | Matsuzaki et al. | 228/151 |
| 4,743,805 | 5/1988 | Takada | 445/35 X |
| 4,751,777 | 6/1988 | Savel, III | 29/149.5 R |

FOREIGN PATENT DOCUMENTS

| | | |
|---|---|---|
| 0214611 | 3/1987 | European Pat. Off. . |
| 0306036 | 3/1989 | European Pat. Off. . |
| 56-156635 | 12/1981 | Japan . |
| 60-34779 | 8/1985 | Japan . |

OTHER PUBLICATIONS

Hiroaki Sasaki, "PRODUCTION OF WELDED PIPE", Patent Abstracts of Japan, Jun. 14, 1984, vol. 8, No. 128 (M-302) [1565].

Hikari Matsuzaki, "PRODUCTION OF MAGNETRON ANODE", Patent Abstracts of Japan, Nov. 2, 1982, vol. 6, No. 218 (E-139)[1096].

*Primary Examiner*—Kenneth J. Ramsey
*Attorney, Agent, or Firm*—Cushman, Darby & Cushman

[57] ABSTRACT

A method for manufacturing a metal cylinder of an electron tube, such as a magnetron, comprises the steps of rolling a metal plate into a cylinder, reduction-forming the cylinder, welding the seam of the reduction-formed cylinder by means of a high-energy beam, and compression-forming the resulting cylinder in the axial direction while restricting the inner and outer peripheral surfaces thereof. The step of beam welding the seam includes arranging a plurality of cylinders to be subjected to the welding lengthwise, so that the adjacent ends of the cylinders are in intimate contact with one another, whereby the respective seams of the cylinders extending in a straight line are subjected in succession to the beam welding. The power of the high-energy beam irradiated onto the seam of each cylinder is controlled so as to be higher in the initial stage of the application to each cylinder and lower in the later stage. A magnetron anode is therafter made by completing an anode cylinder, and radially fixing a plurality of anode vanes to the inside of the anode cylinder. The high-energy beam for welding is irradiated diagonally to the longitudinal plane of the seam.

3 Claims, 11 Drawing Sheets

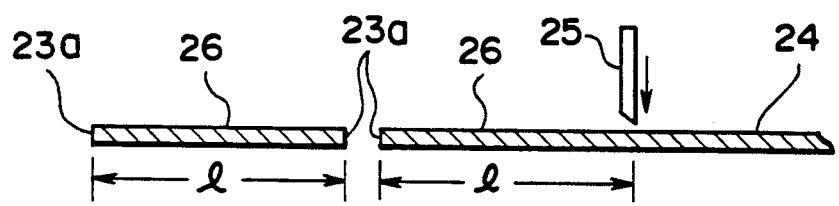
F I G. 3
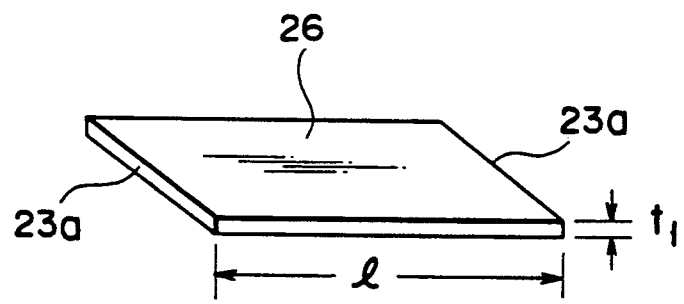
F I G. 4

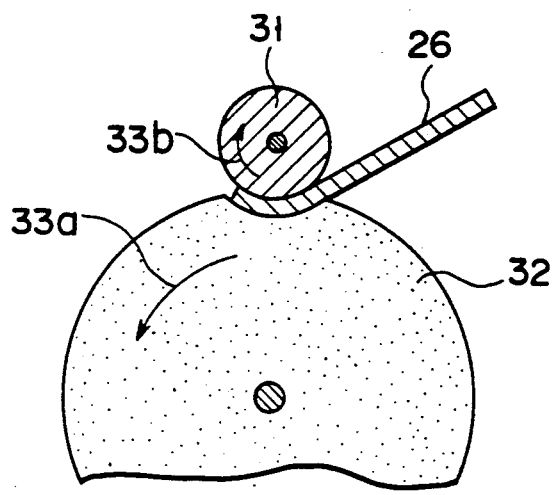
F I G. 5
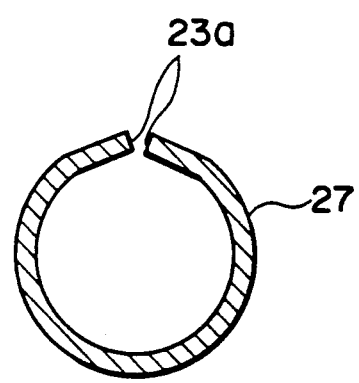
F I G. 6

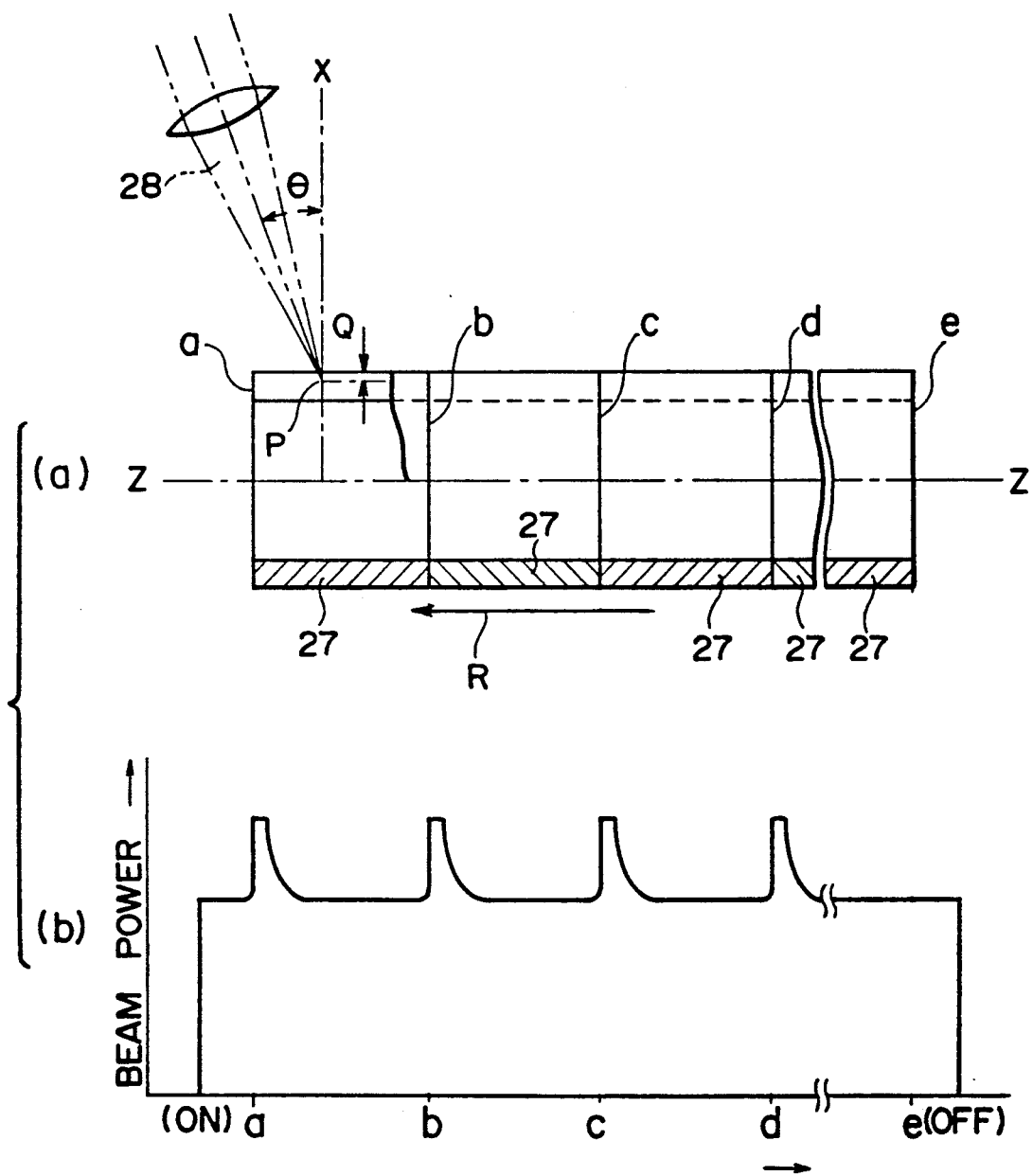
F I G. 10

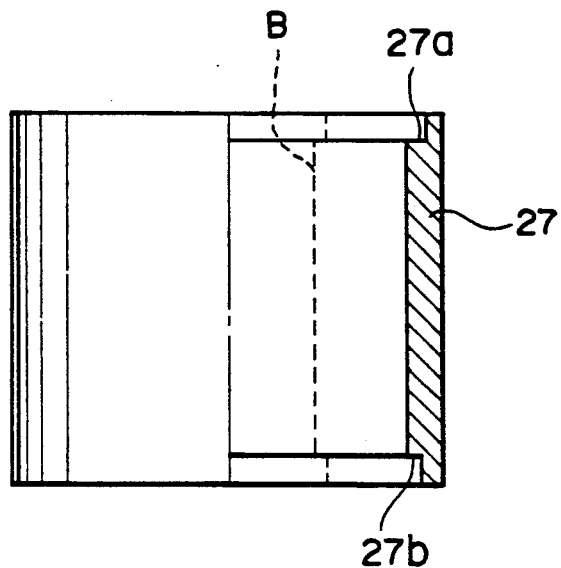
F I G. 14
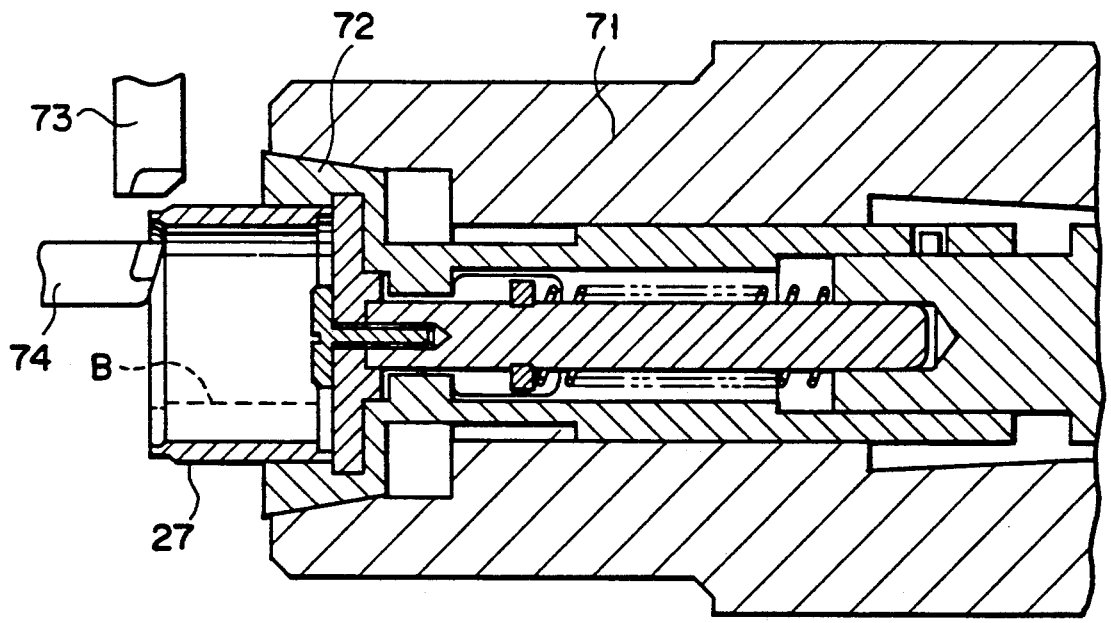
F I G. 15

METHOD FOR MANUFACTURING METAL CYLINDER MEMBERS OF ELECTRON TUBES AND METHOD FOR MANUFACTURING MAGNETRON ANODES

BACKGROUND OF THE INVENTION

1. Field of the Invention

The present invention relates to a method for manufacturing metal cylinder members of electron tubes and a method for manufacturing magnetron anodes.

2. Description of the Related Art

In general, various electron tubes and their vacuum envelopes, various electrodes, such as anodes and grids, resonant cavities, high-frequency waveguides, etc. are partially provided with metal cylinder members.

As is generally known, the anode structure of a magnetron for a microwave oven, for example, is formed of an anode cylinder, a plurality of anode vanes radially arranged on the inner face of the cylinder, and a plurality of resonant cavities corresponding to the number of vanes.

Available as the material for the anode structure are copper, aluminum, etc. which have high electric and thermal conductivity characteristics. In general, copper is preferred because of its higher heat resistance.

In one conventional method for manufacturing the magnetron anode structure, an anode cylinder of a given length is cut from an elongated cylinder or pipe, the inner and outer faces and both open end portions of the anode cylinder are shaved into predetermined configurations, and anode vanes are brazed to the inner peripheral surface of the cylinder.

According to this method, however, manufacture of the cylinder material requires much labor, and if the dimensional accuracy of the cylinder material is not high enough, the completed cylinder must be finished again to the necessary inside and outside diameters for an anode cylinder, thus inevitably entailing an increase in the cost of the product.

Accordingly, a novel method for manufacturing the magnetron anode has already started to be put into practice, in which an anode cylinder is formed by rolling up a plate or material and sealing the opposite end portions thereof. According to this method, manufacture of the plate material is easy, the cylinder can be formed to a desired diameter, and the plate thickness can be controlled during the rolling process. Thus, the cost of the product can be effectively reduced.

FIGS. 1(a) to 1(k) show processes of the conventional manufacturing method, as disclosed in U.S. Pat. No. 4,570,843 issued on Feb. 18, 1986. As shown in FIG. 1(a), an elongated sheet is first cut to a predetermined length l to obtain a copper plate. Thickness t1 of plate 1 is just a little greater than the wall thickness of the anode cylinder as a product, and its length l is equal to or just a little greater than the circumferential length of its medial line. Plate 1 is a hexahedron whose adjacent faces extend basically at right angles to one another.

The anode cylinder is formed from plate 1 in the following processes, and finally, anode vanes are brazed to the cylinder.

The individual processes will be described in succession. As shown in FIG. 1(b), plate 1 is rolled into cylinder 2. In this stage, the opposite end faces of plate 1 are not fully in intimate contact with the cylinder, leaving a V-shaped gap S1 between them.

After undergoing a drawing or reduction forming process, cylinder 2 is cooled to room temperature to obtain cylinder 3, as shown in FIG. 1(c). In this process, gap S3 of seam 6 is adjusted to a very small size.

Thereafter, in the compression forming process shown in FIG. 1(d), cylinder 4 is subjected to an axial compressive force to correct its wall thickness and out of roundness. Thus, cylinder 5 shown in FIG. 1(e) is obtained. In FIG. 1(d), numerals 7, 8 and 9 denote a punch, a fixed die, and a die-and-knockout, respectively.

Subsequently, cylinder 5 is advanced to a process for shaving the open end portions and the inner and outer peripheral surfaces of cylinder 5 to predetermined shapes and dimensions, as shown in FIG. 1(f).

Then, diametrical external force W2 is outwardly applied to cylinder 5 to create gap S4 at seam 10, as shown in FIG. 1(g), and the whole surface of cylinder 11, including the inside seam 10, is degreased and washed or cleaned, as shown in FIG. 1(h).

Then, brazing material 12 is inserted into seam 10, as shown in FIG. 1(i).

After brazing material 12 is inserted in this manner, it can be held in position by the spring-back force of cylinder 11 when external force W2 is removed. This state is shown in FIG. 1(j).

Finally, a brazing process is performed, as shown in FIG. 1(k).

This manufacturing method, however, requires a large amount of silver or gold solder, which is relatively expensive. If a narrow gap remains at seam 10, moreover, the brazing is imperfect, so that airtightness cannot be maintained.

Accordingly, methods for welding the seam by means of a high-energy beam such as an electron beam instead of brazing the seam are disclosed in, for example, Japanese Patent Disclosure No. 156635/81 and Japanese Patent Publication No. 34779/85.

According to these manufacturing methods, however, weld beads remain locally projecting from the inner and outer peripheral surfaces of a magnetron anode, so that the wall thickness is not uniform enough for satisfactory out of roundness. Thus, the beads must be removed by shaving in the final stage.

SUMMARY OF THE INVENTION

The object of the present invention is to provide a method for manufacturing a high-quality metal cylinder member of an electron tube, enjoying high airtightness and sealing performance and having uniform thickness and improved roundness, without leaving any local projections on its inner and outer peripheral surfaces, and a method for manufacturing a magnetron anode.

A method for manufacturing a metal cylinder member of an electron tube according to the present invention comprises the steps of rolling a metal plate into a cylinder, drawing or reduction-forming the cylinder, welding the seam of the reduction-formed cylinder by means of a high-energy beam, and compression-forming the resulting cylinder in its axial direction while restricting the inner and outer peripheral surfaces thereof, the compression forming doubling as drawing or reduction forming.

Iron, nickel, copper, molybdenum, aluminum, and various alloys may be used as materials for the metal cylinder member.

In the method for manufacturing a metal cylinder member according to the present invention, the step of closing the seam by beam welding includes arranging lengthwise a plurality of cylinders to be subjected to welding, so that the adjacent ends of the cylinders are in intimate contact with one another, and the respective seams of the cylinders, extending in a straight line, are subjected in succession to the beam welding. Moreover, the power of the high-energy beam irradiated onto the seam of each cylinder is controlled so as to be higher in the initial stage of the welding of each cylinder and lower in the latter stage.

Thus, according to this manufacturing method, the compression forming is performed after the seam is welded by means of the high-energy beam after reduction forming. Accordingly a high-quality metal cylinder of an electron tube having uniform thickness and improved roundness can be manufactured with high efficiency.

In particular, since compression forming while restricting the inner and outer peripheral surfaces of the metal cylinder, doubling as the reduction forming, is performed after the beam welding, local projections or recesses on the surfaces of the metal cylinder can be avoided.

Accordingly to the second object of the present invention, a method for manufacturing a magnetron anode comprises the steps of rolling a copper plate into a cylinder, drawing or reduction-forming the cylinder, welding the seam of the reduction-formed cylinder by means of a high-energy beam, compression-forming the resulting cylinder in its axial direction while restricting the inner and outer peripheral surfaces thereof, thereby completing an anode cylinder, and radially fixing a plurality of anode vanes to the inside thereof.

In the method for manufacturing a magnetron anode according to the invention, the high-energy beam for welding is irradiated diagonally towards/along the longitudinal plane of the seam. Moreover, the step of welding the seam by the high-energy beam includes arranging the plurality of cylinders to be subjected to welding lengthwise, so that the adjacent ends of the cylinders are in intimate contact with one another, and the respective seams of the cylinders extending in a straight line are subjected in succession to the beam welding.

Thus, according this manufacturing method, the same effect as the aforesaid method for manufacturing the metal cylinder member can be obtained.

Additional objects and advantages of the invention will be set forth in the description which follows, and in part will be obvious from the description, or may be learned by practice of the invention. The objects and advantages of the invention may be realized and obtained by means of the instrumentalities and combinations pointed out particularly in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a sectional view showing a process for cutting an elongated material;

FIG. 4 is a perspective view of a plate piece;

FIG. 5 is a schematic sectional view showing an example of a rolling process;

FIG. 6 is a cross-sectional view showing an example of a cylinder obtained in the rolling process;

FIGS. 10(a) and 10(b) are a half sectional view and a beam power control diagram diametrically showing the beam welding process;

FIG. 14 is a half profile of the cylinder obtained by means of the compression forming process;

FIG. 15 is a profile showing an example of a shaving process;

DETAILED DESCRIPTION OF THE PREFERRED EMBODIMENTS

The following is a detailed description of a method for manufacturing a metal cylinder member of an electron tube according to the present invention, which is applied to the manufacture of an anode structure of a magnetron for a microwave oven.

Figure 17:
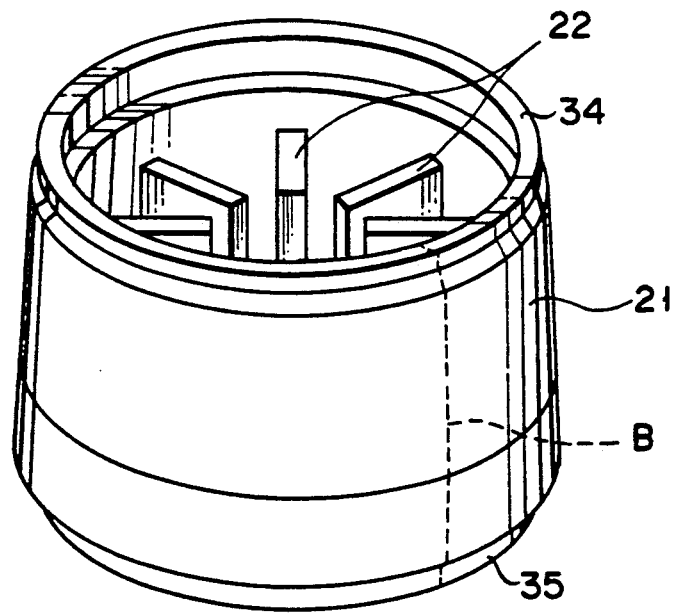
FIG. 17 is a perspective view of a magnetron anode completed by the manufacturing method of the present invention.

In the metal cylinder member or magnetron anode structure manufactured by the method of the present invention, as shown in FIG. 17, a plurality of anode vanes 22 are radially fixed to the inner peripheral wall surface of anode cylinder 21. In this case, cylinder 21 is formed of oxygen-free copper or alloyed copper (hereinafter referred to simply as copper). A seam between both end faces of the cylinder material which extend axially, parallel to each other, is airtightly welded by means of high-energy beam, such as a laser or electron beam.

The beam-weld portion, which is formed without projecting inward or outward, is designated by symbol B.

FIGS. 2 to 15 show the method for manufacturing a magnetron anode according to the present invention. FIGS. 2(a) to 2(i) show the processes of this method. These processes will be successively described in brief before describing each individual process in detail.

First an elongated sheet of copper is cut to predetermined length l, thereby obtaining plate 26 with thickness t1, as shown in FIG. 2(a).

Then, plate piece 26 is rolled into cylinder 27, as shown in FIG. 2(b). In this stage, opposite end faces 23a of plate 26 are not in fully intimate contact with each other, leaving V-shaped gap S1 therebetween.

After undergoing a drawing or reduction forming process, cylinder 27 is cooled to room temperature, as shown in FIG. 2(c). In this process, gap S2 of seam 23 is reduced to a width within a predetermined range (mentioned later).

Thereafter, cylinder 27 is degreased and washed or cleaned so that machining oil or foreign matter adhering to the cylinder is removed, as shown in FIG. 2(d). Since gap S2 is formed at seam 23, the inside of the seam can be degreased and washed or cleaned at the same time.

Subsequently, pressure force W1 is applied to cylinder 27 to close gap S2, as shown in FIG. 2(e), a laser beam is irradiated onto the closed seam 23, thereby locally melting the copper for welding, and the weld portion is cooled. Thus, cylinder 27 is obtained with its seam airtightly closed.

Then, in a compression forming process which doubles as a reduction forming process, cylinder 27 is subjected to an axial compressive force to be plastically deformed, as shown in FIG. 2(f), so that necessary stepped portions 27a and 27b (see FIG. 2(g)) are formed at the open ends of the cylinder. Thus, the wall thickness and roundness can be made uniform. In FIG. 2(f), numerals 51, 59 and 61 denote a punch, a fixed die, and a die-and-knockout, respectively.

Then, cylinder 27 is advanced to a process for shaving the open end portions and the inner and outer peripheral surfaces of cylinder 27 to predetermined shapes and dimensions, as shown in FIG. 2(g). In FIG. 2(g), numeral 73 denotes a shaving tool.

Thereafter, cylinder 27 is completely washed or cleaned, as shown in FIG. 2(h).

Finally, an inspection process is performed, as shown in FIG. 2(i).

The aforementioned magnetron anode structure can be obtained by fixing the anode vanes to the magnetron anode completed in this manner.

The individual processes will hence forth be described in detail.

First, elongated copper sheet 24 is cut to predetermined length l by means of cutter 25, to obtain plate piece 26, as shown in FIGS. 3 and 4. Thickness t1 of cut plate piece 26 is slightly more than the wall thickness of anode cylinder 21 as a product (see FIG. 16), and its length l is equal to or slightly more than the circumferential length of its medial line. Plate 26 is a hexahedron whose adjacent faces extend basically at right angles to one another.

Then, in the rolling process, plate 26 is inserted between core bar roller 31 and circumferential roller 32, formed of a highly elastic material such as polyurethane rubber, which, when engaged under a pressure of scores of kilograms or more, constitute a rolling apparatus, as shown in FIG. 5.

The proper Shore hardness of circumferential roller 32 ranges from 80 to 95. A driving force is applied to roller 32 to rotate it in the direction of arrow 33a. Core bar roller 31 is a hard metal structure with an outside diameter a little shorter than the inside diameter of anode cylinder 21. Roller 31, which is supplied with no driving force, can be rotated in the direction of arrow 33b by a force transmitted from circumferential roller 32.

By this rolling process, plate 26 is formed substantially cylindrical, as shown in FIG. 6. Those portions of cylinder 27 thus obtained which extend close to both end faces 23a are left straight.

If a restrictive force is applied to the outer peripheral surface of plate 26 in the stage where plate 26 is starting to be rolled on the outer peripheral surface of core bar roller 31, the opposite end portions near end faces 23 can be formed rounder than in the case shown in FIG. 6.

Thus, a primary workpiece or cylinder 27 is obtained in the rolling process. The method of rolling is not, however limited to the embodiment described above, and the plate piece may be rolled by means of, e.g., slide dies arranged in four directions.

The following is a description of the drawing or reduction-forming process.

Figure 1:
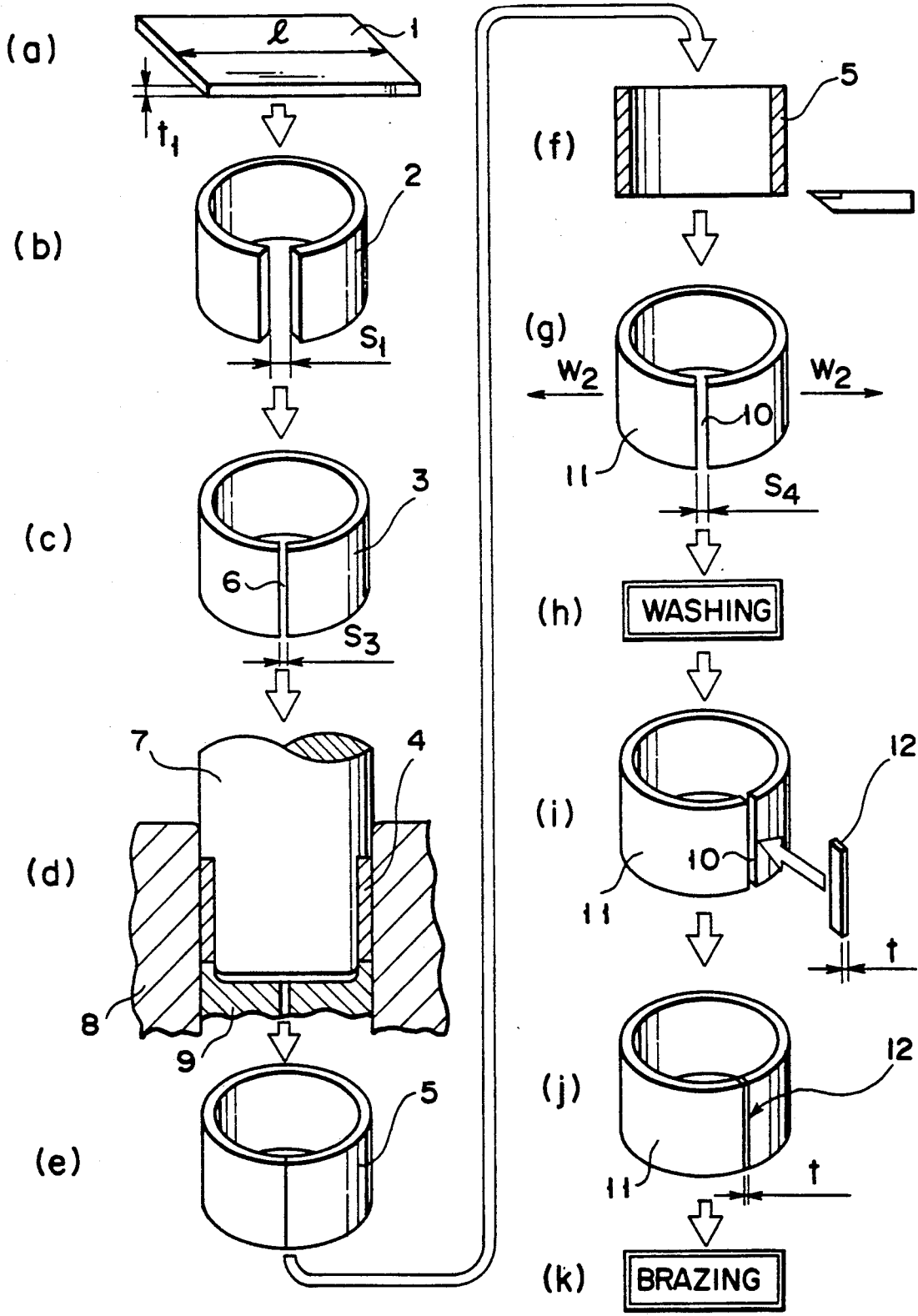
FIGS. 1(a) to 1(k) are perspective or sectional views showing processes of a prior art method for manufacturing a metal cylinder member of an electron tube.
Figure 2:
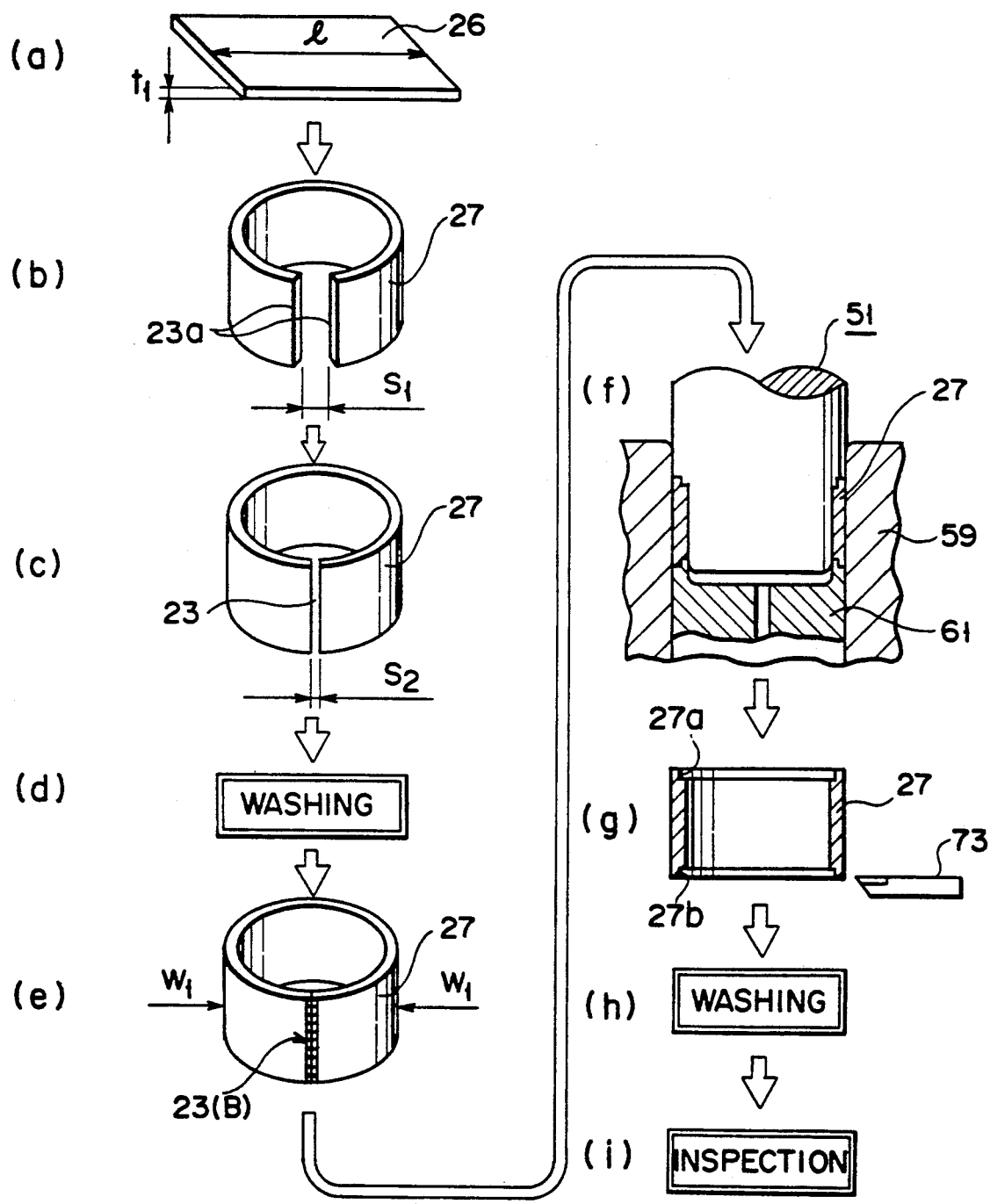
FIGS. 2(a) to 2(i) are perspective or sectional views showing processes of a method for manufacturing a metal cylinder member of an electron tube according to an embodiment of the present invention.
Figure 7:
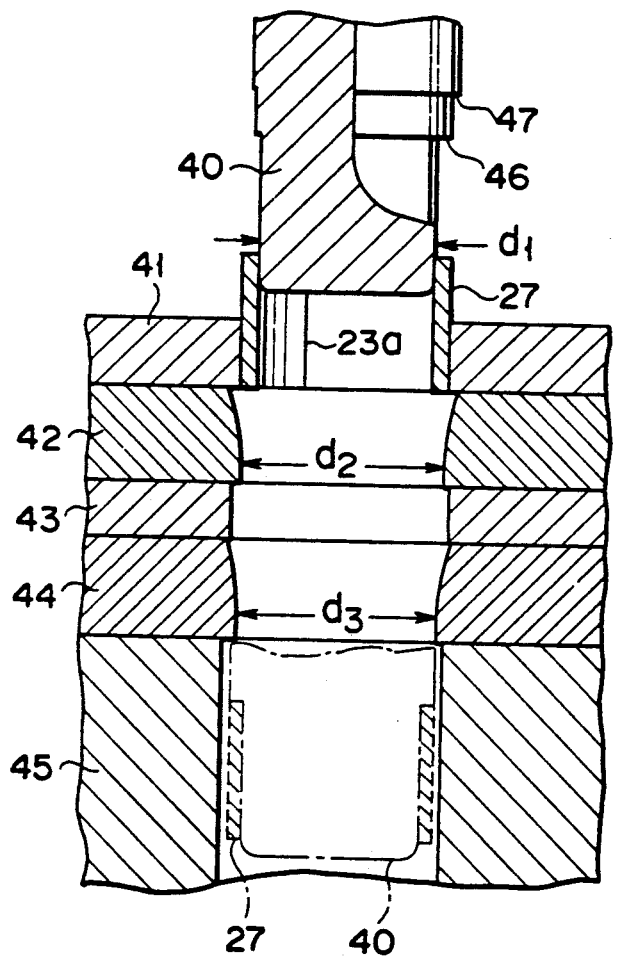
FIG. 7 is a profile showing an example of a reduction forming process.
Figure 8:
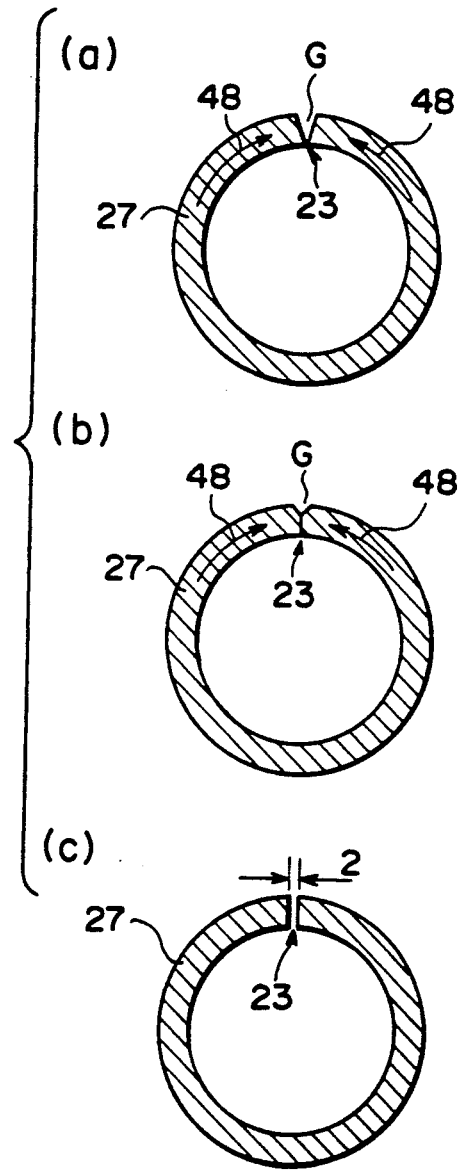
FIGS. 8(a) to (c) are cross-sectional views showing several examples of the cylinder shape obtained in the reduction forming process.

In this process, for example, the outside diameter of cylinder 27 is reduced at one stroke in two successive steps by means of a cold drawing or extrusion apparatus, as shown in FIG. 7. In this apparatus, punch 40 is disposed at the upper portion of FIG. 7 so as to be able to move up and down, and guide 41 for positioning the primary workpiece or cylinder 27, first reducing die 42, guide spacer 43, second reducing die 44, and base 45 are stacked in layers at the lower portion. Outside diameter d1 of punch 40 is substantially equal to the inside diameter of anode cylinder 21 as a finished product, and minimum inside diameter d3 of second die 44 is shorter than minimum inside diameter d2 of first die 42.

Inside diameters d2 and d3 and outside diameter d1 of punch 40 are set so that the rate of thickness reduction of cylinder 27, as the primary workpiece fitted on punch 40 and passing through each die, (ratio of thickness reduction after the passage through each die to the original thickness) is 3% or less.

Punch 40 is provided with stopper portions 46 and 47. Preferably, the thickness reduction rates for first and second reducing dies 42 and 44 are approximately 2% and 3% respectively.

First, cylinder 27 is set inside guide 41, and then punch 40 is lowered so as to be fitted in cylinder 27. As a result, cylinder 27 is pushed by stopper portion 46 through two successive reducing dies 42 and 44 at one stroke. Thus, reduction-formed cylinder 27, as indicated by broken lines, is obtained. A small amount of material trimmed along the axial direction remains on that portion of the outer peripheral surface of punch 40 which extends from one stopper portion 46 to the other stopper portion 47.

By means of this cold drawing or reducing formation, the material of cylinder 27 is caused to make a plastic flow to axial and circumferential direction, as indicated by two arrows 48 in FIG. 8(a), so that V-shaped gap G at seam 23 between the opposite end faces of cylinder 27 is gradually closed from both sides. Then, as shown in FIG. 8(b), V-shaped gap G is narrowed from the inner peripheral surface side to the medial line, and is finally closed. After cylinder 27 is taken out from the forming apparatus, gap S2 of a predetermined size is left at seam 23 by a spring-back force remaining in the material, as shown in FIG. 8(c). If diameter d1 is about 38 mm, for example, the size of gap S2 ranges from about 0.03 to 0.35 mm.

In this reduction-forming, the workpiece is subjected to a high temperature of scores of degrees centigrade, so that it is cooled to a temperature in the vicinity of room temperature by oil cooling or natural cooling.

The reduction-forming process is not limited to the use of the apparatus and method shown in FIG. 7, and may include one-stroke, one-step drawing or reduction forming repeated twice or more, or one-stroke, multi-step reduction forming using three or more reducing dies, or a combination thereof.

After the reduction-forming process described above, cylinder 27 is degreased and washed or cleaned so that machining oil or foreign matter adhering to the cylinder is thoroughly removed. In this process, seam portion 23 between the opposite end faces of cylinder 27 opens slightly, thereby forming gap S2 of predetermined size (0.03 to 0.35 mm), so that the inside of the seam can be degreased and washed or cleaned at the same time.

Figure 9:
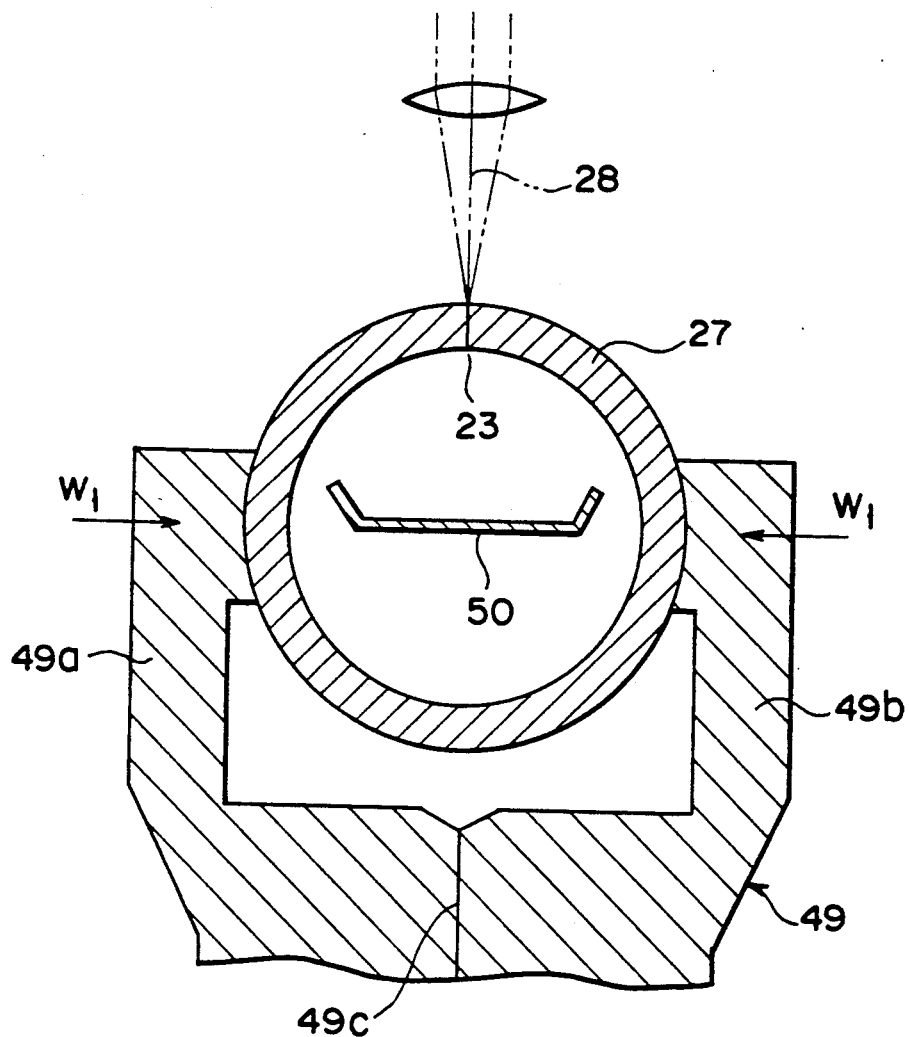
FIG. 9 is a cross-sectional view showing an example of a beam welding process.

Subsequently, laser beam 28 is irradiated onto seam portion 23 of cylinder 27, as shown in FIGS. 9, 10(a) and 10(b), thereby locally melting the copper for welding, whereupon airtight-welded cylinder 27 is obtained. To attain this, a plurality of cylinders 27 to be welded are arranged lengthwise so that their adjacent end faces are in intimate contact with one another. Pressure force W1 is applied to each cylinder 27 by means of two arms 49a and 49b of pressure block 49 so as to close gap S2. Pressure block 49 has stopper surfaces 49c which prevent it from applying excessive pressure on cylinder 27. Thus, the respective seams of the individual cylinders are arranged in a straight line.

Tray 50 is disposed inside cylinder 27 to prevent melted material undesirably adhering to the bottom inner surface of the cylinder during welding.

As shown in FIG. 10(a), laser beam 28 is irradiated onto each cylinder 27 diagonally to axis z thereof, that is, to the longitudinal plane of seam 23; for example, the beam in FIG. 10(a) irradiated at angle $\theta$ approximately 20° to line x, perpendicular to axis z. Accordingly, the laser beam reflected by the material surface can be prevented from returning to a laser oscillator. Thus, accurate power control of the laser oscillator can be ensured.

A carbon dioxide ($CO_2$) laser with a relatively long wavelength is particularly suited for use with the copper material.

Thereupon, the power for the laser beam is turned on before reaching end face a of first cylinder 27, as shown in FIG. 10(b), and the cylinders 27 move in the direction of arrow R, as shown in FIG. 10(a). When the laser beam comes to end face a of first cylinder 27, the laser power is temporarily increased, and gradually decreased thereafter. Thus, while the rear portion of cylinder 27 is being welded, the laser beam is controlled so as to maintain constant power.

When the irradiation position reaches end face b of next cylinder 27, the laser power is increased again to be controlled in the same manner as before. After end face e of last cylinder 27 is passed, the power is turned off. Although cylinders 27 are in intimate contact with one another, therefore, sufficient fusion can be obtained even in the vicinity of the initial-stage end portion of later-stage cylinder 27 which conducts less heat and has a lower temperature. Thus, whole seam 23 can be fully closed by fusion welding. Preferably, the laser beam is irradiated so that its focus P is situated inside the cylinder material at depth Q below the surface of cylinder 27.

When using cylinder 27 whose copper material wall thickness, diameter, and axial length are about 2 mm, 38 mm, and 28 mm respectively, for example, the beam focus P of the $CO_2$ laser suitably has a diameter ranging from about 0.2 to 0.4 mm, the proper beam output ranges from 3 to 10 kW, and the proper moving speed of cylinder 27 ranges from 5 to 10 cm/sec.

After their respective seams 23 ar closed by welding, individual cylinders 27 are connected to one another at their welded portions. Cylinders 27 can, however, be easily separated from one another by twisting end faces b, c, d . . . in intimate contact. Thus, cylinder 27 in the welded state shown in FIG. 11 can be obtained. As is diametrically shown in FIG. 11, fusion layer 29 is observed in a cross section of weld portion B, extending continuously from the outer peripheral surface of cylinder 27 to the inner peripheral surface thereof. Thus, the weld portion is stable both physically and mechanically.

Figure 11:
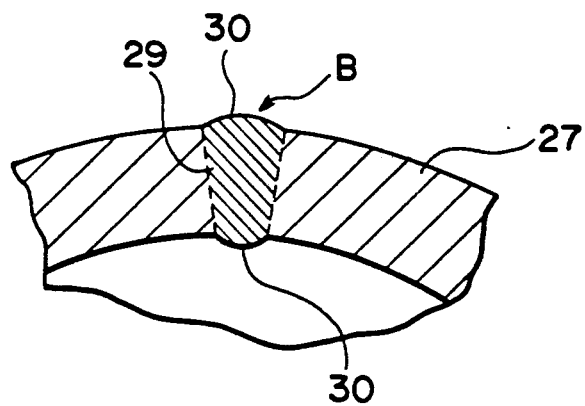
FIG. 11 is an enlarged cross-sectional view showing a welded portion of the cylinder obtained in the beam welding process.

As shown in FIG. 11, moreover, small convex beads 30 of weld metal are formed individually on the inner and outer peripheral surfaces of weld portion B. Concave beads may alternatively be formed depending on the welding conditions or the force of pressure on seam 23.

The high-energy beam used in the beam welding is not limited to a laser beam, and may alternatively be a thermic ray beam or electron beam. Laser or thermic ray beam welding must be performed in a vacuum or inert gas atmosphere in order to prevent oxidation of the cylinder material or containment of air or the like in the melted weld portion. The beam may be applied to either the outer or inner surface of the cylinder 27.

Subsequently, the compression forming process is executed using the apparatus and steps of procedure shown in FIGS. 12 and 13, whereupon anode cylinder 27 is obtained having cylindrical stepped portions 27a and 27b of a given shape along the respective inner circumferences of both open end portions, as shown in FIG. 14.

Figure 12:
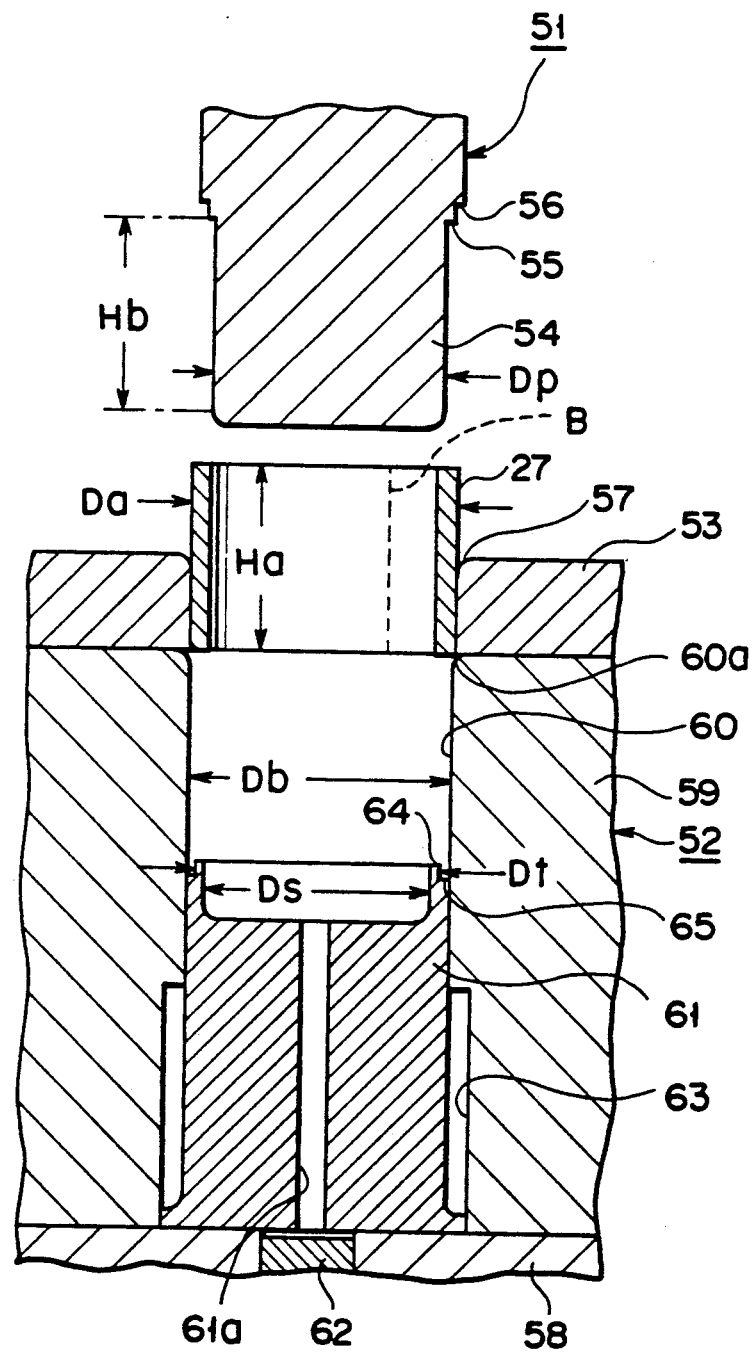
FIG. 12 is a profile showing the state of the cylinder before a compression forming process is started.
Figure 13:
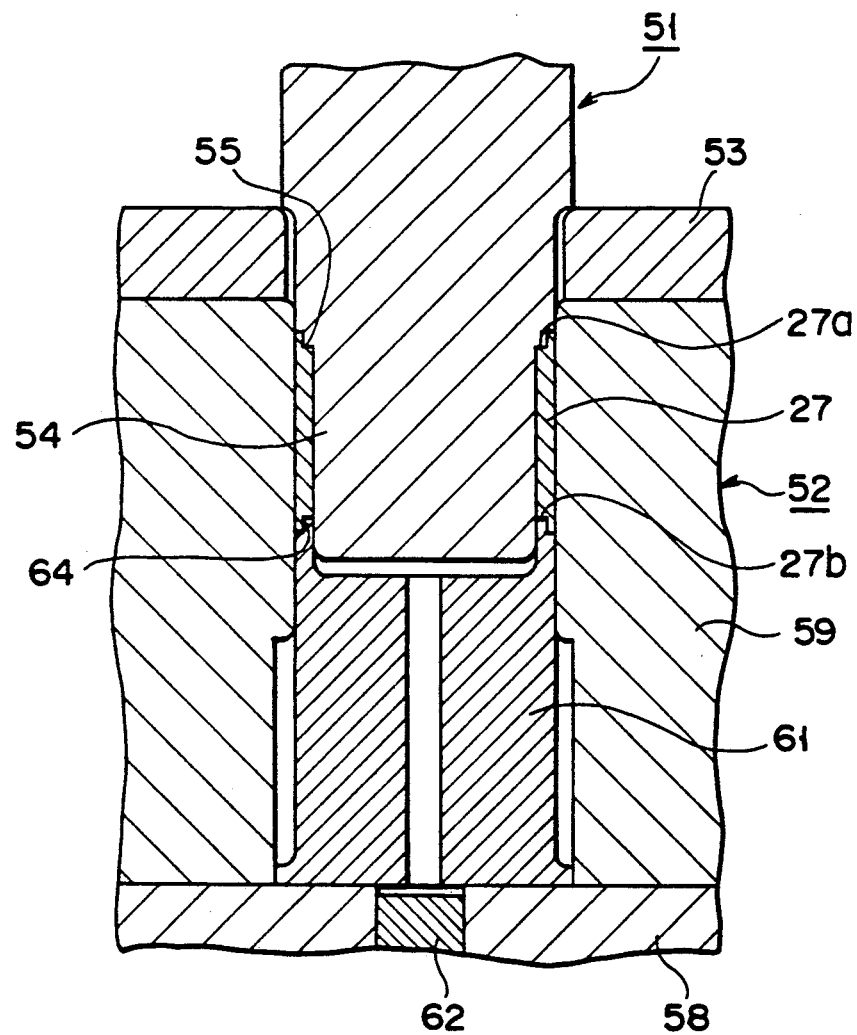
FIG. 13 is a profile showing the state of the cylinder after the compression forming process is finished.

FIG. 12 shows the state immediately before the compression forming process is started, while FIG. 13 shows the state after the compression forming process is finished. The compression forming apparatus comprises columnar punch 51, elongated die 52, and guide 53 for guiding cylinder 27 having undergone the reduction forming process, as a workpiece. Punch 51 includes main column portion 54, having predetermined outside diameter Dp, and two stopper portions 55 and 56 which are integrally formed at height Hb, greater than height Ha of cylinder 27, above the distal end of the punch. Outside diameter Dp of main column portion 54 is equal to the inside diameter of anode cylinder 21 as the finished product. Stopper portions 55 and 56 are column portions whose outside diameters are greater than outside diameter Dp of main column portion 54 by at least two margins. First stopper portion 55 is a stepped portion which serves to form circumferential stepped portion 27a along the inner circumference of one open end portion of cylinder 27 in the compression forming process, as mentioned later.

Guide 53 has center hole 57 in which cylinder 27 is smoothly inserted.

The outside diameter of cylinder 27 as workpiece is given by Da. In this state, cylinder 27 has an inside diameter such that main column portion 54 of punch 51 can be fitted in cylinder 27.

In die 52, fixed die 59 is disposed on base 58 of the apparatus, and die-and-knockout 61 for use as a movable die is tightly fitted in the bottom portion of forming hole 60 in the center of fixed die 59 so as to be vertically movable by means of force cylinder 62. The diameter of hole 60 is slightly reduced by degrees. Guide 53 is coaxially set on fixed die 59. The shape and diameter Db of forming hole 60 of fixed die 59 determine the outer circumferential shape and outside diameter of anode cylinder 21 as a finished product. Diameter Db is slightly less than outside diameter Da of workpiece cylinder 27.

The upper end of forming hole 60 which faces guide 53 is defined by curved surface 60a. Die-and-knockout 61, which is fitted in bottom hole 63 of fixed die 59, serves to hold the bottom end face of cylinder 27 and, in conjunction with punch 51, bind the end face for compression forming.

Die-and-knockout 61 also serves to push cylinder 27 upward and out, thereby disengaging it from fixed die 59 after forming. To attain this, short cylindrical receiving portion 64, in which the distal end portion of punch 51 is tightly fitted, is provided at the upper end portion of die-and-knockout 61. Thus, inside diameter Ds of receiving portion 64 is equal to or just a little greater than outside diameter Dp of punch 51.

Receiving portion 64 is surrounded by circumferential stepped portion 65 which has a predetermined depth and outside diameter Dt intermediate between inside diameter Db of forming hole 60 and inside diameter Ds of receiving portion 64. Vent hole 61a is formed in the central portion of die-and-knockout 61. Die-and-knockout 61 is held on base 58 during the compression forming process, and is pushed up by force cylinder 62 to force cylinder 27 out after forming.

In the compression forming process, workpiece cylinder 27 is fitted on main column portion 54 of punch 51, and is lowered by first stopper portion 55, engaged therewith, to be inserted into forming hole 60 of fixed die 59. As cylinder 27 passes through hole 60, it is drawing or reduction-formed in the axial direction, thereby slightly reducing its wall thickness. At the same time, cylinder 27 is subjected to an axial compressive force in a manner such that its inner and outer peripheral surfaces are held and restricted by punch 51 and fixed die 59, and that its opposite open end portions are held individually between stopper portion 55 of punch 51 and receiving portion 64 of die-and-knockout 61.

After the inner and outer peripheral surfaces and open end portions of cylinder 27 are held and restricted by punch 51 and fixed die 59 in this manner, punch 51 is further lowered to cause a plastic flow in the cylinder material, thereby effecting compression forming. Then, as shown in FIG. 13, stopper portion 55 of punch 51 and receiving portion 64 of die-and-knockout 61 bite respectively into the inside upper and lower ends of cylinder 27 in the axial direction thereof to a predetermined depth.

After this compression forming process is finished, punch 51 is drawn upward, and force cylinder 62 is pushed up to eject compression-formed cylinder 27 shown in FIG. 14. By means of this process, which covers both drawing or reduction forming and compression forming, convex bead 30 of weld metal can be removed so that cylinder 27 enjoys improved roundness and uniform wall thickness throughout its circumference and depth. Moreover, circumferential stepped portions 27a and 27b of cylinder 27 can be simultaneously formed at the two opposite open end portions thereof by means of stopper portion 55 of punch 51 and receiving portion 64 of die-and-knockout 61.

Having undergone the compression forming process, as described above, cylinder 27 suffers slight burrs or rugged surfaces attributable to surplus material at one or both open ends. These burrs or rugged surfaces are shaved to finish the cylinder into a shape necessary for anode cylinder 21. To attain this, a shaving process is performed.

Figure 16:
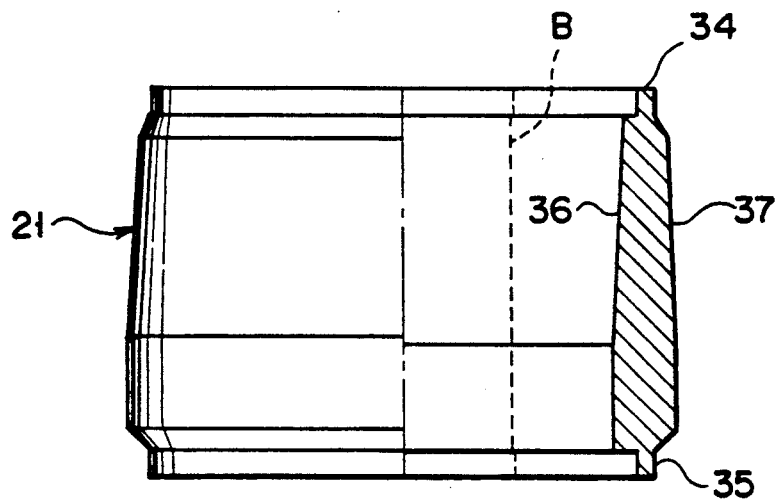
FIG. 16 is a half sectional view of an anode cylinder obtained by means of the shaving process.

In the shaving process, as shown in FIG. 15, cylinder 27 is shaved in the circumferential direction while being held by means of a chuck and rotated at high speed, as shown in FIG. 15. Cylinder 27, as a workpiece is held by means of chuck 72 at the distal end of cylindrical holder 71 of a shaving apparatus. In this state, cylinder 27 is shaved into the required shape by means of shaving tools 73 and 74 as it is rotated at high speed. By doing this, anode cylinder 21 is obtained having end configurations 34 and 35 and inner and outer tapered peripheral surfaces 36 and 37, as shown in FIG. 16.

Inner and outer tapered surfaces 36 and 37 may alternatively be formed in the compression forming process doubling as the reduction forming process. In this case, it is necessary only that the die or punch have a tapered surface.

Finally, a predetermined number of anode vanes 22 are fixed to the inner peripheral wall of anode cylinder 21 by brazing or beam welding, whereupon the magnetron anode shown in FIG. 17 can be obtained.

Although the metal cylinder member is formed of copper in the embodiment described above, it may be a cylinder member of a predetermined length made of any other suitable metal material.

According to the present invention, compression forming is performed after the sea is closed and welded by means of the high-energy beam after the drawing or reduction forming. Thus, a high quality metal cylinder member of an electron tube or a magnetron anode, having uniform wall thickness and improved roundness, can be manufactured with high efficiency.

Since, in particular the compression forming while restricting the inner and outer peripheral surfaces of the metal cylinder or the magnetron anode, doubling as the reduction forming, is performed after the beam welding, local projections or recesses on the surfaces can be avoided.

Additional advantages and modifications will readily occur to those skilled in the art. Therefore, the invention in its broader aspects is not limited to the specific details and illustrated examples shown and described herein. Accordingly, various modifications may be made without departing from the spirit or scope of the general inventive concept a defined by the appended claims and their equivalents.

What is claimed is:

1. A method for manufacturing a metal cylinder member of an electron tube, comprising the steps of:
   rolling a metal plate into a cylinder;
   reduction-forming the cylinder;
   high-energy beam welding the seam of the reduction-formed cylinder said welding step including arranging a plurality of cylinders to be subjected to the welding lengthwise, so that the adjacent ends of the cylinders are in intimate contact with one another, whereby the respective seams of the cylinders extending in a straight line are subjected in succession to the beam welding, and subsequently separated from one another; and
   compression-forming the resulting cylinder in the axial direction to cause a plastic flow in the material, while restricting the inner and outer peripheral surfaces thereof.

2. A method for manufacturing a metal cylinder member of an electron tube according to claim 1, wherein the power of the high-energy beam irradiated onto the seam of each cylinder is controlled so as to be higher in the initial stage of application to each cylinder and lower in the latter stage.

3. A method for manufacturing a magnetron anode, comprising the steps of:

rolling a copper plate into a cylinder;

reduction-forming the cylinder;

high-energy beam welding the seam of the reduction-formed cylinder, said welding step including arranging a plurality of cylinders to be welded lengthwise, so that the adjacent ends of the cylinders are in intimate contact with one another, so that the respective seams of the cylinders extending in a straight line are subjected in succession to the beam welding, and subsequently separated from one another;

compression-forming the resulting cylinder in the axial direction to cause a plastic flow in the material, while restricting the inner and outer peripheral surfaces thereof, thereby completing an anode cylinder; and radially fixing a plurality of anode vanes to the inside of the anode cylinder.

* * * * *